United States Patent
Himmatramka et al.

(10) Patent No.: US 12,427,841 B2
(45) Date of Patent: Sep. 30, 2025

(54) TONNEAU COVER OPERATION

(71) Applicant: Rivian IP Holdings, LLC, Plymouth, MI (US)

(72) Inventors: Shakshi Himmatramka, Irvine, CA (US); Ivan Swee Choon Lim, Costa Mesa, CA (US); Chaitanya Manoj Shah, Irvine, CA (US); Bhushan Nagarajan, Tustin, CA (US); Manish Jakhi, Irvine, CA (US)

(73) Assignee: Rivian IP Holdings, LLC

( * ) Notice: Subject to any disclaimer, the term of this patent is extended or adjusted under 35 U.S.C. 154(b) by 344 days.

(21) Appl. No.: 18/147,905

(22) Filed: Dec. 29, 2022

(65) Prior Publication Data
US 2024/0217321 A1    Jul. 4, 2024

(51) Int. Cl.
*B60J 7/12* (2006.01)
*B60J 7/14* (2006.01)

(52) U.S. Cl.
CPC ............. *B60J 7/1204* (2013.01); *B60J 7/141* (2013.01)

(58) Field of Classification Search
CPC . B60J 7/041; B60J 7/0573; B60J 7/062; B60J 7/067; B60J 7/1204; B60J 7/141; B60J 7/1607; E05F 15/41; E05F 15/44; E05F 15/46
USPC ............ 296/100.01, 100.02, 100.03, 100.11, 296/100.12
See application file for complete search history.

(56) References Cited

U.S. PATENT DOCUMENTS

| | | | |
|---|---|---|---|
| 7,342,373 B2 * | 3/2008 | Newman | B60H 1/00735 318/471 |
| 9,663,981 B2 * | 5/2017 | Conner | E05F 15/60 |
| 9,731,584 B2 * | 8/2017 | Hannan | B60J 7/068 |
| 11,884,145 B2 * | 1/2024 | Pompili | B60R 5/048 |
| 12,083,875 B2 * | 9/2024 | Pattabhiraman | B60R 16/033 |
| 2014/0021736 A1 * | 1/2014 | Chenowth | H02H 7/0855 361/29 |
| 2023/0159112 A1 * | 5/2023 | Spray | E06B 9/74 296/100.01 |
| 2024/0011344 A1 * | 1/2024 | Junod | B60J 7/1607 |

FOREIGN PATENT DOCUMENTS

DE     102021209836 A1 *  3/2023  ............ B60J 7/0573

OTHER PUBLICATIONS

English translation of DE 10 2021 209 836; retrieved via Patent Translate located at www.epo.org. (Year: 2025).*

* cited by examiner

*Primary Examiner* — Jason S Daniels
(74) *Attorney, Agent, or Firm* — FOLEY & LARDNER LLP

(57) ABSTRACT

Systems and methods to detect obstruction include detecting, by a sensor, a first parameter that corresponds to a path of traversal of a tonneau cover, determining, based on a comparison between the first parameter and a second parameter, a presence of an obstacle in the path of traversal of the tonneau cover, and modifying operation of the vehicle in response to the presence of the obstacle in the path of traversal of the tonneau cover.

20 Claims, 9 Drawing Sheets

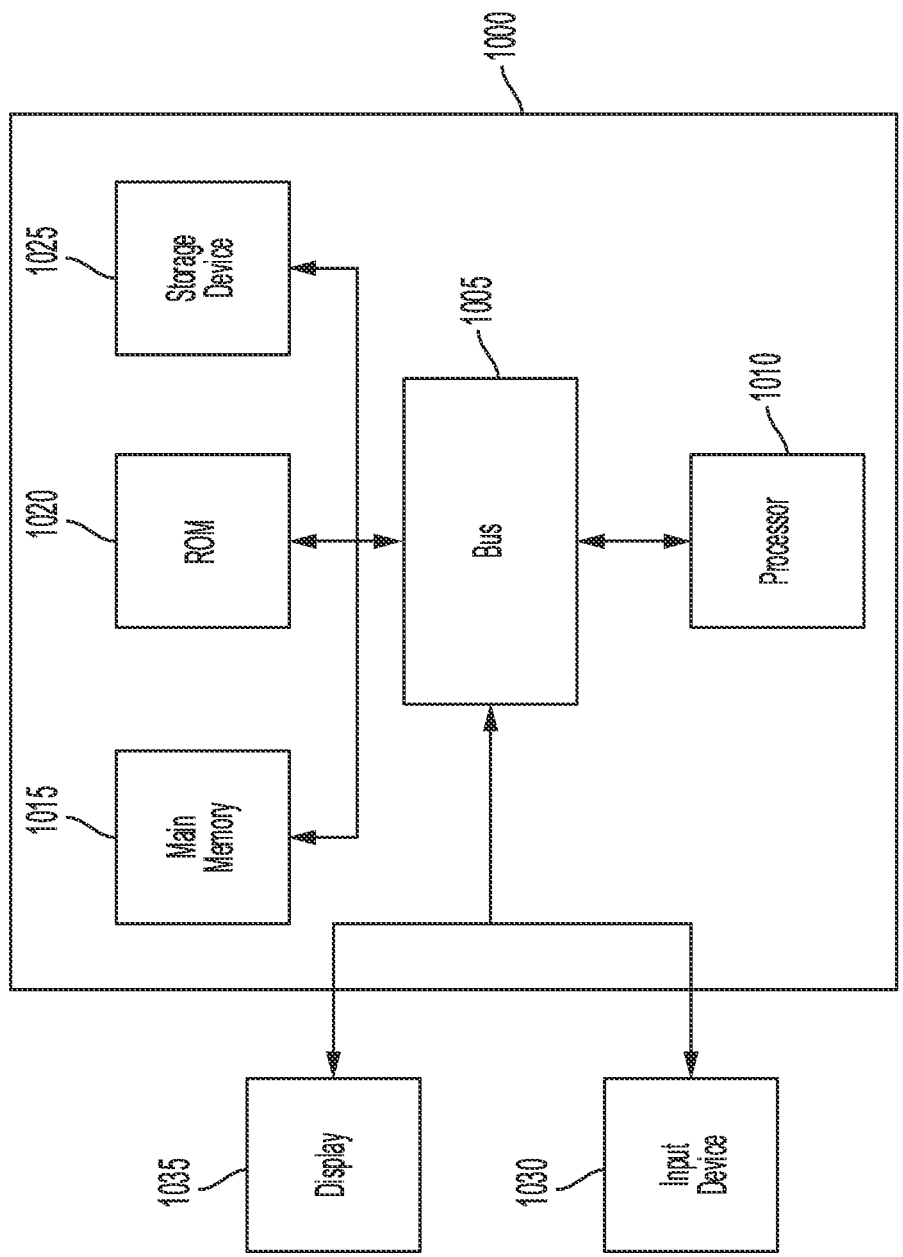

TONNEAU COVER OPERATION

INTRODUCTION

A vehicle can operate in an environment with various objects. Conventional vehicles are not able to react effectively and timely to various objects in an environment of the vehicle.

SUMMARY

This technical solution can detect obstruction during automatic movement. For example, the technical solution can use position feedback and its derivative from a tonneau cover subsystem mounted to a vehicle to detect change in a mechanical or electrical aspect of the system and accordingly flag that an object is detected. The technical solution can use displacement, velocity, acceleration, or current feedback or any derivative thereof, from the subsystem to detect sudden force increase in the subsystem and accordingly flag that object is detected. For example, an operator can receive audible, haptic or visual via HMI or mobile device when an object is detected. The above examples can work in parallel to each other, providing a robust technique to detect and notify the user of object detection. Thus, this technical solution can provide at least a technical improvement of an integrated solution for automatically closing or opening of a tonneau cover based on object detection in the truck bed or on the cover and notification of said detection.

At least one aspect is directed to a system to detect an obstacle predicted to impact continuous operation of a powered, or electrically retractable tonneau cover. The system can include a sensor operatively coupled with a tonneau cover of a vehicle, and a processor and memory. The system can detect, by the sensor, a first parameter that corresponds to a path of traversal of the tonneau cover. The system can determine, by the processor, a second parameter associated with a predicted operating characteristic of the tonneau cover. The system can determine, based on a comparison between the first parameter and the second parameter, a presence of an obstacle in the path of traversal of the tonneau cover. The system can modify operation of the vehicle in response to the presence of the obstacle in the path of traversal of the tonneau cover.

At least one aspect is directed to a method to detect an obstacle predicted to impact continuous operation of the tonneau cover. The method can include detecting, by a sensor operatively coupled with a tonneau cover of a vehicle, a first parameter corresponding to a path of traversal of the tonneau cover. The method can include determining a second parameter associated with a predicted operating characteristic of the tonneau cover. The method can include determining, based on a comparison between the first parameter and a second parameter, a presence of an obstacle in the path of traversal of the tonneau cover. The method can include modifying operation of the vehicle in response to the presence of the obstacle in the path of traversal of the tonneau cover.

At least one aspect is directed to a vehicle to detect an obstacle predicted to impact continuous operation of the tonneau cover. The vehicle can include a tonneau cover, a sensor operatively coupled with the tonneau cover, and a processor and memory. The vehicle can detect, by the sensor, a first parameter that corresponds to a path of traversal of the tonneau cover. The vehicle can determine, by the processor, a second parameter associated with a predicted operating characteristic of the tonneau cover. The vehicle can determine, by the processor and based on a comparison between the first parameter and a second parameter, a presence of an obstacle in the path of traversal of the tonneau cover. The vehicle can modify operation of the vehicle in response to the presence of the obstacle in the path of traversal of the tonneau cover.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 10 is a block diagram illustrating an architecture for a computer system that can be employed to implement elements of the systems and methods described and illustrated herein.

DETAILED DESCRIPTION

Following below are more detailed descriptions of various concepts related to, and implementations of, methods, apparatuses, and systems of detection of a tonneau cover obstruction. The various concepts introduced above and discussed in greater detail below can be implemented in any of numerous ways.

Systems and methods of the present technical solution can compare an actual movement or electrical activity of a tonneau cover during operation to an expected movement or electrical activity of a tonneau cover in operation. The technical solution can detect various electrical or mechanical characteristics of a tonneau cover, and can determine an expected operation of the tonneau cover with respect to the characteristics of the tonneau cover and of a vehicle into which the tonneau cover is installed or integrated. For example, the technical solution can generate a model corresponding to a predicted trajectory of the tonneau cover with respect to the particular flatbed of the vehicle onto which it is installed. The technical solution can generate the model based on particular structures or characteristics of the particular vehicle on which it is installed. For example, the technical solution can generate the model to indicate a particular velocity or acceleration of movement of the tonneau cover expected near the completion of a closing movement, to engage a latch between a flatbed of the vehicle, or tonneau, and the tonneau cover. The technical solution can detect a deviation or difference between the predicted trajectory and an actual trajectory of movement of the tonneau cover to determine whether an obstacle is present in the path of traversal of the tonneau cover. The present disclosure is directed to systems and methods of detection of a tonneau cover obstruction. Thus, the disclosed solutions have a technical advantage of at least sensing obstructions in a flatbed of a vehicle in the path of a tonneau cover based on electrical, mechanical, and physical characteristics of the particular tonneau cover and the particular vehicle integrated with or installed at that tonneau cover.

Figure 1:
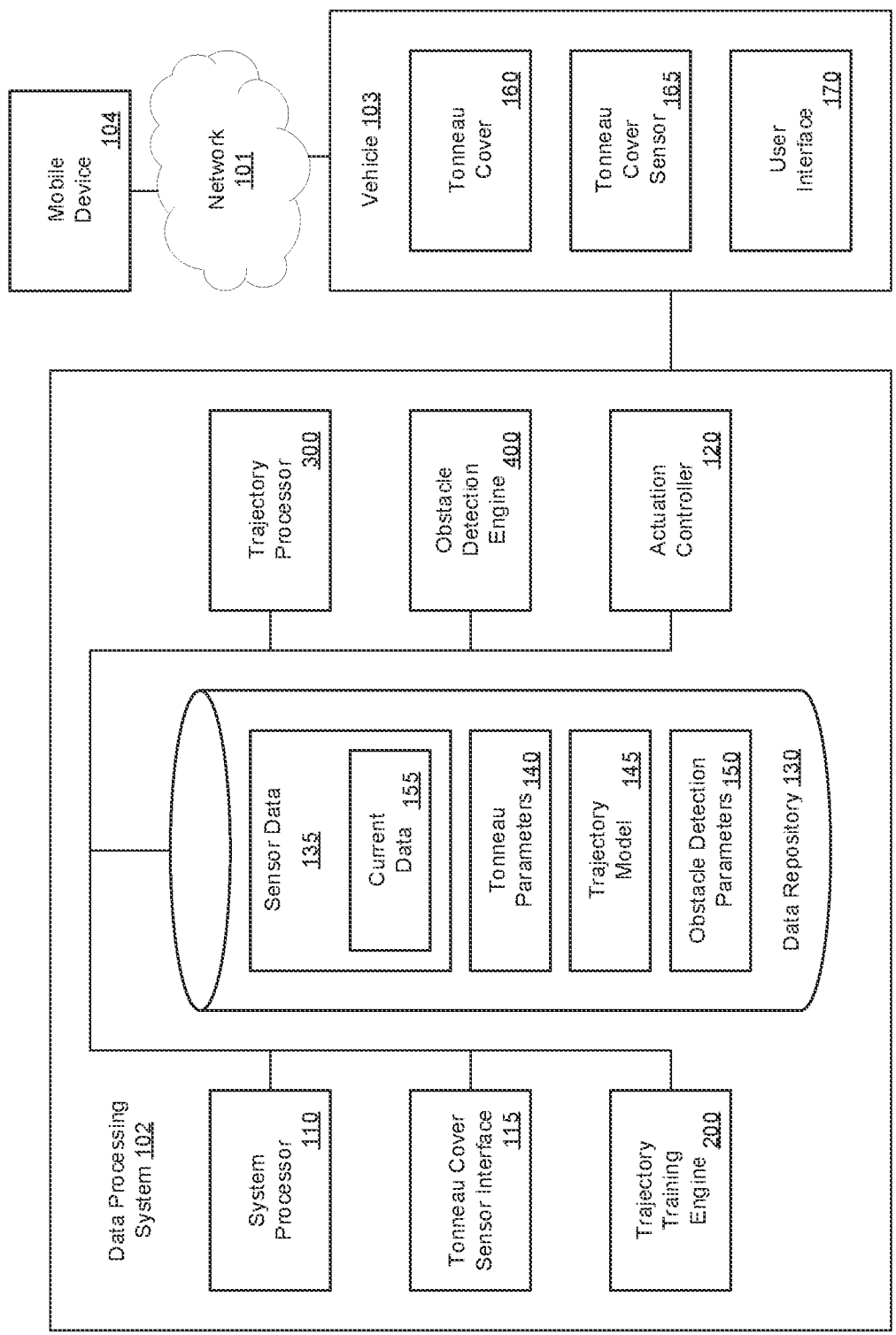
FIG. 1 depicts an example system to detect tonneau cover obstruction.

FIG. 1 depicts an example system for tonneau cover detection. As illustrated by way of example in FIG. 1, an example system 100 can include at least a network 101, a data processing system 102, a vehicle 103, and a mobile device 104.

The network 101 can be any type or form of network. The geographical scope of the network 101 can vary widely and the network 101 can be a body area network (BAN), a personal area network (PAN), a local-area network (LAN), e.g. Intranet, a metropolitan area network (MAN), a wide area network (WAN), or the Internet. The topology of the network 101 can be of any form and can include, e.g., any of the following: point-to-point, bus, star, ring, mesh, or tree. The network 101 can be an overlay network which is virtual and sits on top of one or more layers of other networks 101. The network 101 can be of any such network topology as known to those ordinarily skilled in the art capable of supporting the operations described herein. The network 101 can utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite can include application layer, transport layer, internet layer (including, e.g., IPv6), or the link layer. The network 101 can be a type of a broadcast network, a telecommunications network, a data communication network, or a computer network.

The data processing system 102 can include a physical computer system operatively coupled or that can be coupled with the network 101 and the vehicle 103, either directly or directly through an intermediate computing device or system. The data processing system 102 can include a virtual computing system, an operating system, and a communication bus to effect communication and processing. The data processing system 102, or any component thereof, can be located at least partially at the vehicle 103 or remotely from the vehicle 103. The data processing system 102, or any component thereof, can be located at least partially at the mobile device 104 or remotely from the mobile device 104. At least some elements of the data processing system 102 can be part of the vehicle 103 such that any instance of the vehicle 103 has its own instance of those at least some elements. For example, the obstacle detection engine 400 can be associated specifically with the vehicle 103. The data processing system 102 can include other or additional elements that can be considered desirable to have in performing the functions described herein.

The data processing system 102 can include a system processor 110, a tonneau sensor interface 115, an actuation controller 120, and a data repository 130, a trajectory training engine 200, a trajectory processor 300, and an obstacle detection engine 400.

The system processor 110 can execute one or more instructions associated with the system 100. The system processor 110 can include an electronic processor, an integrated circuit, or the like including one or more of digital logic, analog logic, digital sensors, analog sensors, communication buses, volatile memory, nonvolatile memory, and the like. The system processor 110 can include, but is not limited to, at least one microcontroller unit (MCU), microprocessor unit (MPU), central processing unit (CPU), graphics processing unit (GPU), physics processing unit (PPU), embedded controller (EC), or the like. The system processor 110 can include a memory operable to store or storing one or more instructions for operating components of the system processor 110 and operating components operably coupled to the system processor 110. The one or more instructions can include at least one of firmware, software, hardware, operating systems, embedded operating systems, and the like. The system processor 110 or the system 100 generally can include at least one communication bus controller to effect communication between the system processor 110 and the other elements of the system 100.

The tonneau cover sensor interface 115 can obtain one or more sensor signals from the vehicle 103, including one or more sensor signals from the tonneau cover 160. For example, the tonneau cover sensor interface 115 can include one or more components in communication with the vehicle 103 or the tonneau cover sensor 165, either directly or indirectly, to receive one or more instructions indicating state of the tonneau 165. For example, the tonneau cover sensor interface 115 can receive data indicating mechanical or electrical characteristics of the tonneau cover 160. For example, a tonneau cover can include a cover portion and a motor portion. The motor portion can be activated to move the tonneau cover between or into one or more of a closed position and an open position, or a partial state between the open position and the closed position. Mechanical characteristics can include position, velocity, acceleration, or any derivative thereof, of the tonneau cover 160 or the motor actuating the movement of the tonneau cover 160 between an open and closed state.

The trajectory training engine 200 can generate a model corresponding to a predicted trajectory of movement of the tonneau cover 160. The trajectory training engine 200 can include a machine learning model configured to receive as input one or more mechanical or electrical characteristics of the tonneau cover 160. The machine learning model of the trajectory training engine 200 can, for example, receive input from the tonneau cover sensor interface 115. The trajectory training engine 200 can include a machine learning model configured to generate the model using machine learning or to obtain a pre-existing model trained using machine learning from a remote system via the network 101, based on the input obtained from the tonneau cover sensor interface 115. For example, the trajectory training engine 200 can generate a model using machine learning that indicates an expected performance over a particular time period of the tonneau cover 160 based on one or more of characteristics of the motor of the tonneau cover 160, characteristics of the tonneau cover sensor 165, and characteristics of the 103. For example, a model can be based on a sensitivity of the tonneau cover sensor 165 to detect one or more of displacement, velocity and acceleration of the tonneau cover 160, on current or rate of change of current at the motor of the tonneau cover 160, a length of a bed of the vehicle 103, a width of the bed of the vehicle 103, any combination thereof, or other inputs. For example, the time period can be measured in seconds or fractions thereof, and can span seconds or minutes. The trajectory training engine 200 can obtain a number of inputs from the tonneau cover sensor 165 and can generate a smoothed or aggregate trajectory model based on input corresponding to multiple instances of opening or closing the tonneau cover 160 of the vehicle 103, or one or more tonneau covers and vehicles respectively having characteristics matching characteristics of the tonneau cover 160 and the vehicle 103. The trajectory training engine 200 can both train various trajectory models and execute various trained trajectory models. For example, the trajectory training engine 200 can generate a trained model and can execute a previously trained model. Thus, the trajectory training engine 200 is not limited to training a model or generating a trained model. Both a predicted trajectory and an actual trajectory can be generated using machine learning, but are not limited to generation by machine learning.

For example, a predicted trajectory can correspond to a particular movement or electrical activity of a tonneau cover under desired conditions or conditions compatible with minimum error or wear in operation of the tonneau cover. For example, the predicted trajectory can be based on an aggregate of multiple instances of operation of a tonneau cover in which an error condition or wear state of the tonneau cover is absent. For example, an actual trajectory can correspond to a particular movement or electrical activity of a tonneau cover within a particular instance of operation of the tonneau cover. For example, the actual trajectory can correspond to a real-time or instantaneous model of activity of the tonneau cover.

The trajectory processor 300 can generate a model corresponding to an actual trajectory of movement of the tonneau cover 160. The trajectory processor 300 can include a machine learning model configured to obtain as input one or more mechanical or electrical characteristics of the tonneau cover 160. The machine learning model of the trajectory processor 300 can, for example, receive input from the tonneau cover sensor interface 115. The trajectory training engine 200 can include a machine learning model configured to generate the model using machine learning or to obtain a pre-existing model trained using machine learning from a remote system via the network 101, based on the input received from the tonneau cover sensor interface 115 during operation of the tonneau cover 160. For example, the trajectory processor 300 can generate a model using machine learning that indicates an actual performance of the tonneau cover 160 at a particular time corresponding to the time of detection, based on one or more of characteristics of the motor of the tonneau cover 160, characteristics of the tonneau cover sensor 165, and characteristics of the 103. For example, the trajectory processor 300 can generate the actual trajectory based on a sensitivity of the tonneau cover sensor 165 to detect one or more of displacement, velocity and acceleration of the tonneau cover 160, on current or rate of change of current at the motor of the tonneau cover 160, a length of a bed of the vehicle 103, a width of the bed of the vehicle 103, or any combination thereof.

The obstacle detection engine 400 can determine whether the actual trajectory of the tonneau cover 160 deviates from a predicted trajectory of the tonneau cover and indicates presence of an obstacle in the path of traversal of the tonneau cover 160. For example, an obstacle can include an object placed in the flatbed of the vehicle 103 that is partially within the flatbed and partially outside the flatbed. For example, an obstacle can include a chair or other furniture having a height greater than a height of the flatbed of the vehicle 103. For example, a path of traversal of the tonneau cover 160 can include area or volume of space the tonneau cover 160 can occupy in closed state. For example, the obstacle detection engine 400 can identify one or more parameters of the operation of the tonneau cover 160 that satisfy a threshold of indication of an obstruction. For example, the obstacle detection engine 400 detect a velocity of the tonneau cover 160 at a particular time according to the actual trajectory that does not meet a threshold difference with a predicted trajectory for the tonneau cover 160 at that time. The times can be relative times, for example, indicating a time+0.5 s after activation of the tonneau cover in an open state to enter a closed state. Obstruction, for example, can include any determination by comparing the predicted trajectory with the actual trajectory, and is not limited to the particular examples discussed herein.

The system 100 can include a first parameter corresponding to a trajectory of movement of the tonneau cover 160. The system 100 can identify a second parameter corresponding to a predicted trajectory of movement of the tonneau cover cover 160. For example, the second parameter can be associated with a predicted operating characteristic of the tonneau cover. For example, a predicted operating characteristic can correspond to a position, displacement, velocity, acceleration, or jerk of a predicted trajectory at one or more times. The system 100 can generate, based on one or more of a predetermined jerk corresponding to the tonneau cover cover 160, a predetermined velocity of movement of the tonneau cover cover 160, and a predetermined acceleration of movement of the tonneau cover 160, the second parameter. For example, jerk can correspond to rate of change of acceleration.

The system 100 can generate, based on an error between one or more of a first metric of the first parameter that indicates detected torque at the tonneau cover 160 and a second metric of the second parameter that indicates a threshold corresponding to the detected torque, the comparison that indicates the presence of the obstacle in the path of traversal of the tonneau cover 160. The system 100 can generate, based on an error between one or more of a first metric of the first parameter that indicates detected velocity of the tonneau cover 160 or detected acceleration of the tonneau cover 160, and a second metric of the second parameter that indicates a threshold corresponding to the detected velocity or the detected acceleration, the comparison that indicates the presence of the obstacle in the path of traversal of the tonneau cover 106.

The system 100 can generate, based on an error between one or more of a first metric of the first parameter that indicates detected current at a motor of the tonneau cover 160 or detected rate of change of current at the motor of the tonneau cover 160, and a second metric of the second parameter that indicates a threshold corresponding to the detected current or the detected rate of change of current, the comparison that indicates the presence of the obstacle in the path of traversal of the tonneau cover 160. The system 100 can generate, based on an error between one or more of a first metric of the first parameter that indicates detected displacement of the tonneau cover 160 and a second metric of the second parameter that indicates a threshold corresponding to the detected displacement of the tonneau cover 160, the comparison that indicates the presence of the obstacle in the path of traversal of the tonneau cover 160.

The actuation controller 120 can generate one or more instructions to respond to an indication of presence of an obstacle in the path of traversal of the tonneau cover 160, in response to receiving that indication from the obstacle detection engine 400. For example, the actuation controller 120 can instruct a user interface 170 of the vehicle 103 to present a visual or audio indication at a display panel or by a vehicle speaker that communicates to a driver presence of an obstacle in the path of traversal of the tonneau cover 160. For example, the actuation controller 120 can instruct a user interface of the mobile device 104 to present a visual or audio indication at a display panel or by a vehicle speaker that communicates to an owner of the vehicle 103 presence of an obstacle in the path of traversal of the tonneau cover 160. For example, the actuation controller 120 can instruct a motor of the tonneau cover 160 to modify its operation by slowing or stopping its movement. The system 100 can modify the operation of the vehicle 103 to modify one or more of a position of the tonneau cover 160, a velocity of movement of the tonneau cover 160, and an acceleration of movement of the tonneau cover 160. The actuation controller 120 can instruct the tonneau cover 160 to open and close independently of or in the absence of input via the obstacle detection engine 400. For example, the actuation controller 120 can instruct the tonneau cover 160 to open and close in response to receiving input at the user interface 170 to open or close the tonneau cover. The actuation controller can be completely or partially located at one or more of the data processing system 102 and the vehicle 103. For example, the actuation controller 120 can instruct a camera of the vehicle 103 to activate or deactivate in response to an indication of presence of an obstacle in the path of traversal of the tonneau cover 160, in response to receiving that indication from the obstacle detection engine 400.

The data repository 130 can store data associated with the system 100. The data repository 130 can include one or more hardware memory devices to store binary data, digital data, or the like. The data repository 130 can include one or more electrical components, electronic components, programmable electronic components, reprogrammable electronic components, integrated circuits, semiconductor devices, flip flops, arithmetic units, or the like. The data repository 130 can include at least one of a non-volatile memory device, a solid-state memory device, a flash memory device, and a NAND memory device. The data repository 130 can include one or more addressable memory regions disposed on one or more physical memory arrays. The data repository 130 can include a sensor data storage 135, a tonneau parameter storage 140, a trajectory model storage 145, and an obstacle detection parameter storage 150.

The sensor data storage 135 can store sensor data obtained by the tonneau cover sensor interface 115 and the tonneau cover sensor 165. The sensor data storage 135 can include at least data corresponding to position, displacement, velocity, acceleration, and any derivative thereof, of movement of the tonneau cover. The sensor data storage 135 can include a current data storage 155. The current data storage 155 can include at least data corresponding to current, rate of change of current, voltage, inductance, capacitance, or any combination thereof, of operation of a motor of the tonneau cover 160. The tonneau parameter storage 140 can store data corresponding to mechanical or electrical characteristics corresponding to one or more of the vehicle 103, a bed of the vehicle 103, and the tonneau cover 160. The trajectory model storage 145 can store one or more trajectory models, including expected trajectory models and actual trajectory models. The trajectory model storage 145 receive and transmit predetermined trajectory models via the network 101. The obstacle detection parameter storage 150 can store one or more parameters indicative of presence of an obstacle in the path of the tonneau cover 160. For example, the parameters can include one or more threshold indicating a maximum distance between an actual trajectory and a predicted trajectory at a particular time during a period of operation of the tonneau cover 160. For example, the thresholds can include variable thresholds that can scale based on time or a vehicle operating characteristic, such as speed. For example, the thresholds can be static.

The vehicle 103 can include an electric vehicle, but is not limited thereto. The vehicle 103 can include a utility vehicle having a flatbed portion. The vehicle 103 can include a tonneau cover 160, a tonneau cover sensor 165, and a user interface 170.

The tonneau cover 160 can include a cover that can be retractable to cover and uncover the flatbed of the vehicle 103 at least partially or completely. The tonneau cover 160 can be located at an edge of the flatbed at a top of the flatbed at or above a top edge of a tailgate of the vehicle 103, for example. For example, the tonneau cover 160 can include a DC motor or an AC motor that can be activated to cause an angular momentum to open and close the tonneau cover 160. The tonneau cover 160 can be moved by manual operation or by powered operation. For example, the tonneau cover 160 can be disengaged from a motor to be operated manually by a hand crank or the like.

The tonneau cover sensor 165 can include one or more analog or digital sensor devices coupled with one or more components of the tonneau cover 160. The tonneau cover sensor 165 can include a Hall effect sensor disposed on or integrated with the motor of the tonneau cover 160 to detect angular position, displacement, velocity, acceleration, and any derivative thereof. For example, the tonneau cover sensor 165 transmit a Hall effect reading directly to the tonneau cover sensor interface 155, and can generate one or more of linear or angular position, displacement, velocity, acceleration, and any derivative thereof, based on the Hall effect reading.

The tonneau cover sensor 165 can include a camera to capture one or more images at least partially including at least a portion of the tonneau cover 160 or a regions of the vehicle 103 corresponding to at least a portion of a path of traversal of the tonneau cover 160. For example, the camera can include an activation switch or input component to activate or deactivate the camera in response to an electrical, electronic, or digital input to the activation switch or component. The camera can capture still or video images at a framerate corresponding to or based on a trajectory of the tonneau cover 160 or a resolution of the Hall effect sensor. For example, the camera can have a framerate twice that of a sampling rate of the Hall effect sensor. The camera can record at least a portion of a tonneau in response to an obstacle detection corresponding to the tonneau cover 160, to provide image data or live video of a state of the tonneau cover 160 or a portion of the vehicle 103 corresponding to the tonneau cover 160. For example, the actuation controller 120 can instruct the user interface 170 of the vehicle 103 to present video captured at the camera in response to an obstacle detection corresponding to the tonneau cover 160. For example, the actuation controller 120 can instruct the mobile device 104 to present video captured at the camera in response to an obstacle detection corresponding to the tonneau cover 160.

The Hall effect sensor can have a power consumption characteristic lower than a corresponding power consumption characteristics of the camera. For example, the Hall effect sensor can consumer power at a wattage of one-tenth a wattage of power consumption of the camera in an activated state. Thus, this technical solution can include a technical improvement of at least conserving power expenditure by selectively activating a camera device corresponding to the tonneau cover 160 in response to an obstacle detection corresponding to the tonneau cover 160.

The vehicle 103 can include one or more of a display device, a sound generating device, and a haptic feedback device integrated in a cabin, dash, seat, control device, wheel, stick, or any combination thereof. The vehicle 103 can include the user interface 170. The user interface 170 can be operable with any component of the vehicle 103 to generate any indications, presentations, or the like, discussed herein. The system 100 can modify the operation of the vehicle 103 to cause the user interface 170 of the vehicle 103 to present an indication of the presence of the obstacle in the path of traversal of the tonneau cover 160.

The mobile device 104 can include a smartphone, tablet, laptop computer, wearable device, or the like. The mobile device 104 can include one or more of a display device, a sound generating device, and a haptic feedback device. The mobile device 104 can include a user interface operable with any component of the mobile device 104 to generate any indications, presentations, or the like, discussed herein.

Figure 2:
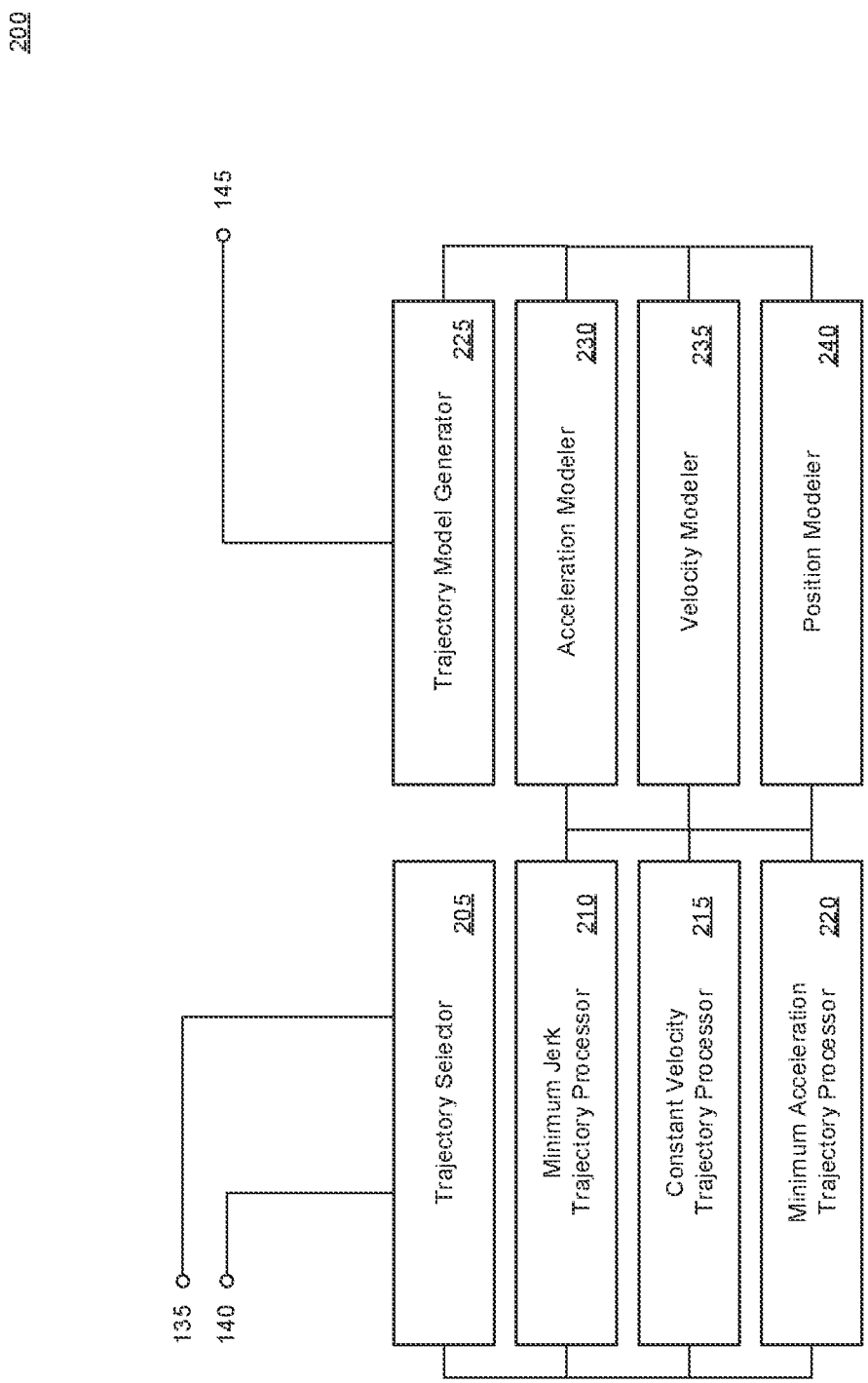
FIG. 2 depicts an example trajectory training engine.

FIG. 2 depicts an example trajectory training engine. As illustrated by way of example in FIG. 2, an example trajectory training engine 200 can include at least a trajectory selector 205, a minimum jerk trajectory processor 210, a constant velocity trajectory processor 215, a minimum acceleration trajectory processor 220, a trajectory model generator 225, an acceleration modeler 230, a velocity modeler 235, and a position modeler 240. The trajectory training engine 200 can include one or more logical or electronic devices including but not limited to integrated circuits, logic gates, flip flops, gate arrays, programmable gate arrays, and the like. Any electrical, electronic, or like devices, or components associated with the trajectory training engine 200 can also be associated with, integrated with, integrable with, replaced by, supplemented by, complemented by, or the like, the system processor 110 or any component thereof.

The trajectory selector 205 can select a trajectory processor among the processors 210, 215 and 220 corresponding to a particular trajectory type. For example, a trajectory type can correspond to a particular metric or physical characteristics of the tonneau cover 160 or a motor thereof. The trajectory selector 205 can obtain an input that indicates a trajectory type via, for example, a user interface of the vehicle 103, the mobile device 104, or via the network 101.

The minimum jerk trajectory processor 210 can generate metrics corresponding to movement of a tonneau cover 160 in accordance with a predetermined threshold corresponding to jerk. For example, jerk can include change in acceleration over time, or the derivative of acceleration. For example, metrics generated by the minimum jerk trajectory processor 210 can correspond to a pattern of movement of the tonneau cover 160 having a jerk metric below a predetermined jerk threshold, or a jerk metric below a predetermined percentile of jerk values that can the tonneau cover 160 can undergo. The minimum jerk trajectory processor 210 can provide input to one or more of the acceleration modeler 230, the velocity modeler 235, and the position modeler 240.

The constant velocity trajectory processor 215 can generate metrics corresponding to movement of a tonneau cover 160 in accordance with a predetermined threshold corresponding to velocity. For example, metrics generated by the constant velocity trajectory processor 215 can correspond to a pattern of movement of the tonneau cover 160 having a constant velocity during an opening or closing operation of the tonneau cover 160, a velocity exceeding a minimum velocity threshold, or a velocity below a maximum velocity threshold. The minimum jerk trajectory processor 210 can provide input to one or more of the acceleration modeler 230, the velocity modeler 235, and the position modeler 240.

The minimum acceleration trajectory processor 220 can generate metrics corresponding to movement of a tonneau cover 160 in accordance with a predetermined threshold corresponding to acceleration. For example, metrics generated by the minimum acceleration trajectory processor 220 can correspond to a pattern of movement of the tonneau cover 160 having an acceleration metric below a predetermined acceleration threshold, or an acceleration metric below a predetermined percentile of acceleration values that can the tonneau cover 160 can undergo. The minimum acceleration trajectory processor 220 can provide input to one or more of the acceleration modeler 230, the velocity modeler 235, and the position modeler 240.

The trajectory model generator 225 can generate a model corresponding to a predicted trajectory that satisfies one or more of the trajectories selected by the trajectory selector 205. For example, the trajectory model generator 225 can transform output generated by one or more of the acceleration modeler 230, the velocity modeler 235, and the position modeler 240 into a predicted trajectory model. The trajectory model generator 225 can transmit a generated trajectory to the trajectory model storage 145. The trajectory model generator 225 can combine coordinates of one or more of the acceleration modeler 230, the velocity modeler 235, and the position modeler 240 based on time value coordinates thereof into an N-dimensional coordinate.

The acceleration modeler 230 can generate an expected acceleration model corresponding to an expected acceleration of a tonneau cover 160 during an opening or closing operation thereof. For example, the acceleration modeler 230 can generate a model that includes coordinates including acceleration values and corresponding time values. For example, the coordinate can be a two-dimensional coordinate. The velocity modeler 235 can generate an expected velocity model corresponding to an expected velocity of a tonneau cover 160 during an opening or closing operation thereof. For example, the velocity modeler 235 can generate a model that includes coordinates including velocity values and corresponding time values. For example, the coordinate can be a two-dimensional coordinate.

The position modeler 240 can generate an expected displacement model corresponding to an expected position of a tonneau cover 160 during an opening or closing operation thereof. For example, the position modeler 240 can generate a model that includes coordinates including position values and corresponding time values. For example, the coordinate can be a two-dimensional coordinate. For example, position can correspond to an absolute location of a point with respect to an origin in a coordinate space. For example, displacement can correspond to a relative position of a point with respect to another position of that point.

Figure 3:
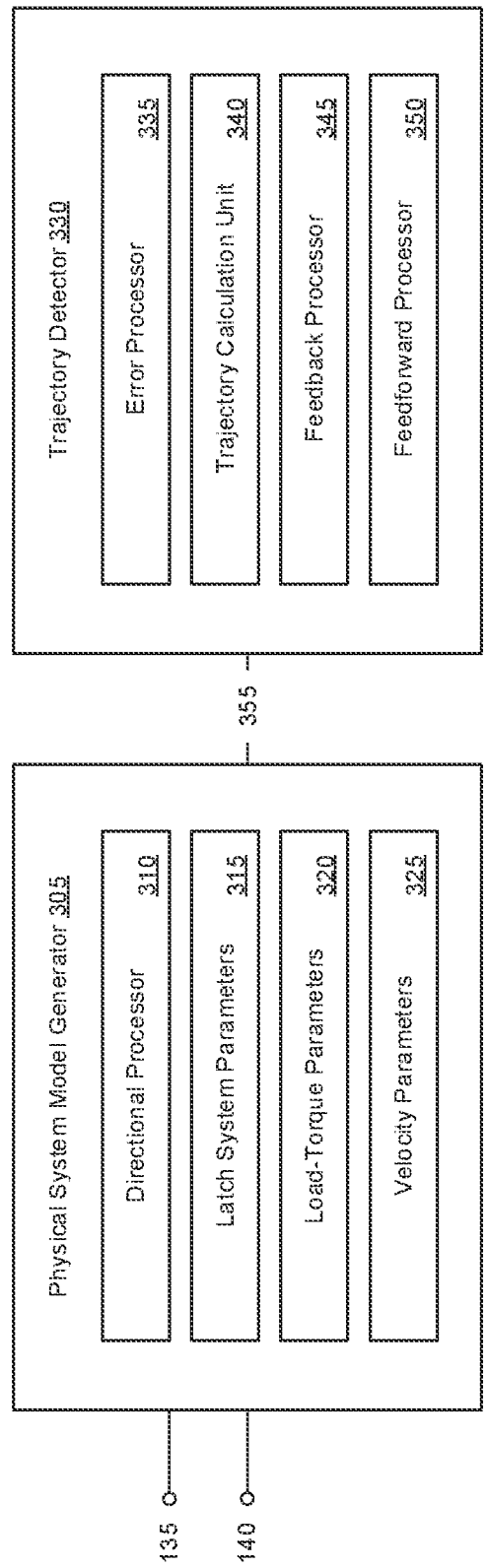
FIG. 3 depicts an example trajectory processor.

FIG. 3 depicts an example trajectory processor. As illustrated by way of example in FIG. 3, an example trajectory processor 300 can include at least a physical system model generator 305, a trajectory detector 330, and a feed loop communication channel 355. The trajectory processor 300 can include one or more logical or electronic devices including but not limited to integrated circuits, logic gates, flip flops, gate arrays, programmable gate arrays, and the like. Any electrical, electronic, or like devices, or components associated with the trajectory processor 300 can also be associated with, integrated with, integrable with, replaced by, supplemented by, complemented by, or the like, the system processor 110 or any component thereof.

The physical system model generator 305 can generate a model corresponding to an actual trajectory. The physical system model generator 305 can obtain input data from the tonneau cover sensor 165, and can generate one or more instantaneous values corresponding to particular aspects of movement of the tonneau cover 160. The physical system model generator 305 can include a directional processor 310, latch system parameters 315, load-torque parameters 320, and velocity parameters 325.

The directional processor 310 can identify a direction of movement of the tonneau cover 160. For example, the directional processor 310 can identify that a tonneau cover is moving in either an opening direction or a closing direction in response to identifying a direction of angular movement of the motor of the tonneau cover. The latch system parameters 315 can indicate the presence and type of a latch mechanism associated with the tonneau cover 160. For example, a latch mechanism can include a clasp or fastener to couple an edge of the tonneau cover 160 in an opened state with an edge of the tailgate of the vehicle 103. The latch system parameters 315 can indicate a particular acceleration, velocity, position, or displacement metric corresponding to a particular latch compatible with the tonneau cover 160 and the vehicle 103. For example, the latch system parameters 315 can indicate an optimal velocity at which to move the tonneau cover 160 at the end of an opening process to engage a latch with the tailgate of the vehicle 103. For example, the latch system parameters 315 can vary based on a length of the flatbed or a type of the latch mechanism including a varying amount of force required to engage or disengage the particular latch mechanism.

The load-torque parameters 320 can indicate a particular acceleration, velocity, position, or displacement metric corresponding to a particular torque compatible with the tonneau cover 160 and the vehicle 103. For example, the load-torque parameters 320 can indicate a minimum or maximum torque achievable by the particular motor of the tonneau cover 160. The velocity parameters 325 can indicate particular acceleration, velocity, position, or displacement metric corresponding to the tonneau cover 160 and the vehicle 103. For example, the velocity parameters 325 can indicate a minimum or maximum acceleration, velocity, position, or displacement achievable by the particular motor of the tonneau cover 160.

The trajectory detector 330 can generate an instantaneous trajectory corresponding to movement of the tonneau cover 160 during movement of the tonneau cover 160. For example, the trajectory detector 330 can generate a trajectory based on concurrent or simultaneous movement of the tonneau cover 160. The trajectory detector 330 can include an error processor 335, a trajectory calculation unit 340, a feedback processor 345, and a feedforward processor 350.

The error processor 335 can generate an error based on feedback and feedforward input between the trajectory detector 330 and the physical system model generator 305.

The trajectory calculation unit 340 can execute one or more arithmetic or algebraic processes to generate one or more metrics associated with the movement of the tonneau cover 160. For example, the trajectory calculation unit 340 can execute a proportion operation to generate a scaled value based on an input proportion and an input value. For example, the trajectory calculation unit 340 can execute an integration operation to generate an integral value at a particular time based on an input function and an input value. For example, the trajectory calculation unit 340 can execute a derivation operation to generate a derivative value at a particular time based on an input function and an input value. The feedback processor 345 can receive feedback input from one or more of the trajectory detector 330 and the physical system model generator 305. The feedforward processor 350 can receive feedforward input from one or more of the trajectory detector 330 and the physical system model generator 305. The feed loop communication channel 355 can couple the trajectory detector 330 and the physical system model generator 305 to provide feedback and feedforward loop communication there between.

Figure 4:
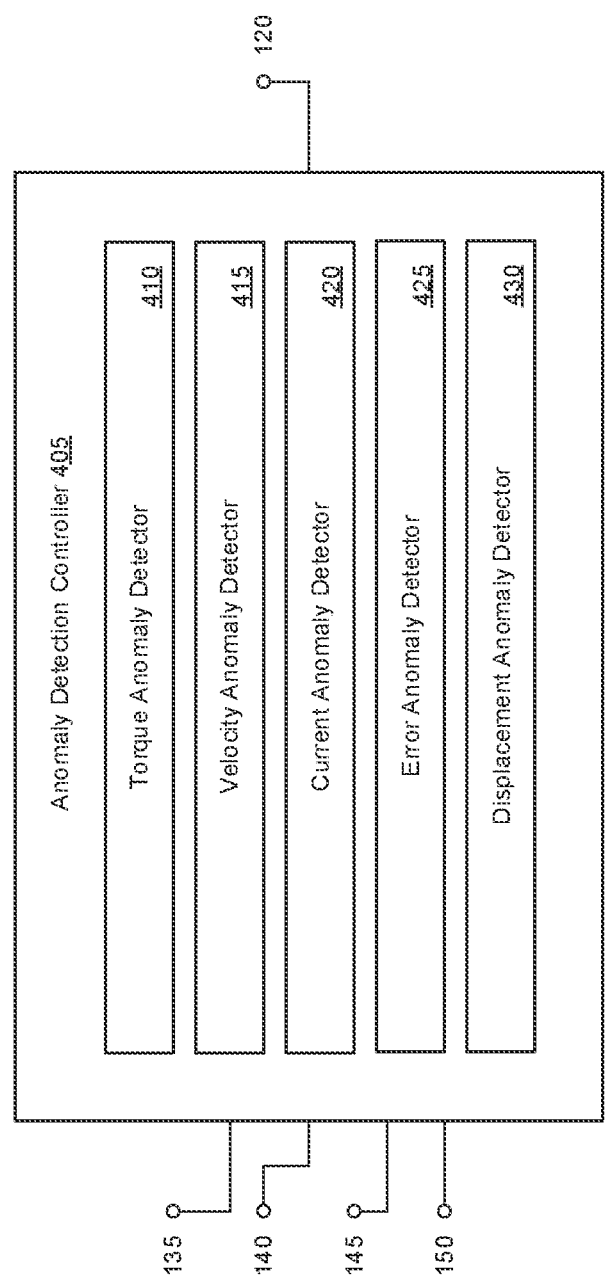
FIG. 4 depicts an example obstacle detection engine.

FIG. 4 depicts an example obstacle detection engine. As illustrated by way of example in FIG. 4, an example obstacle detection engine 400 can include at least and an anomaly detection controller 405. The obstacle detection engine 400 can include one or more logical or electronic devices including but not limited to integrated circuits, logic gates, flip flops, gate arrays, programmable gate arrays, and the like. Any electrical, electronic, or like devices, or components associated with the obstacle detection engine 400 can also be associated with, integrated with, integrable with, replaced by, supplemented by, complemented by, or the like, the system processor 110 or any component thereof.

The anomaly detection controller 405 can detect instantaneous deviation between a predicted trajectory of a tonneau cover 160 and an actual trajectory of the tonneau cover 165. The anomaly detection controller 405 can include a torque anomaly detector 410, a velocity anomaly detector 415, a current anomaly detector 420, an error anomaly detector 425, and a displacement anomaly detector 430.

The torque anomaly detector 410 can detect a deviation between an expected torque of a motor of a tonneau cover 160 and an actual instantaneous torque of the motor of the tonneau cover 160. For example, the torque anomaly detector 410 can detect a deviation between a trajectory having an expected value of torque at a particular time relative to a start of an opening or closing operation of the tonneau cover 160, and a trajectory having an actual value of torque at a particular time relative to a start of an opening or closing operation of the tonneau cover 160. For example, the torque anomaly detector 410 can detect a torque exceeding an expected maximum torque of a motor of the tonneau cover 160 that can indicate a stressed state of the motor applying additional energy to move in the presence of an obstacle.

The velocity anomaly detector 415 can detect a deviation between an expected velocity of a tonneau cover 160 and an actual instantaneous velocity of the tonneau cover 160. For example, the velocity anomaly detector 415 can detect a deviation between a trajectory having an expected value of velocity at a particular time relative to a start of an opening or closing operation of the tonneau cover 160, and a trajectory having an actual value of velocity at a particular time relative to a start of an opening or closing operation of the tonneau cover 160. For example, the velocity anomaly detector 415 can detect a velocity below an expected minimum velocity of the tonneau cover 160 that can indicate a stressed state of the motor applying additional energy to move in the presence of an obstacle.

The current anomaly detector 420 can detect a deviation between an expected current or rate of change of current of a motor of a tonneau cover 160 and an actual instantaneous current or rate of change of current of the motor of the tonneau cover 160. For example, the current anomaly detector 420 can detect a deviation between a trajectory having an expected value of current or rate of change of current at a particular time relative to a start of an opening or closing operation of the tonneau cover 160, and a trajectory having an actual value of current or rate of change of current at a particular time relative to a start of an opening or closing operation of the tonneau cover 160. For example, the current anomaly detector 420 can detect a torque exceeding an expected maximum torque of a motor of the tonneau cover 160 that can indicate a stressed state of the motor applying additional energy to move in the presence of an obstacle.

The error anomaly detector 425 can detect a deviation between a predicted trajectory of a tonneau cover 160 and an actual instantaneous trajectory of the tonneau cover 160. For example, the error anomaly detector 425 can detect a deviation between a predicted trajectory at a particular time relative to a start of an opening or closing operation of the tonneau cover 160, and an actual trajectory at a particular time relative to a start of an opening or closing operation of the tonneau cover 160. For example, the error anomaly detector 425 can detect an error in trajectory of the tonneau cover 160 corresponding to slowing or stalling of the tonneau cover 160 that can indicate a stressed state of the motor applying additional energy to move in the presence of an obstacle.

The displacement anomaly detector 430 can detect a deviation between an expected position or displacement of a tonneau cover 160 and an actual instantaneous position or displacement of the tonneau cover 160. For example, the displacement anomaly detector 430 can detect a deviation between a trajectory having an expected value of position or displacement at a particular time relative to a start of an opening or closing operation of the tonneau cover 160, and a trajectory having an actual value of position or displacement at a particular time relative to a start of an opening or closing operation of the tonneau cover 160. For example, the displacement anomaly detector 430 can detect a position or displacement below an expected minimum position or displacement of the tonneau cover 160 that can indicate a stressed state of the motor applying additional energy to move in the presence of an obstacle.

Figure 5:
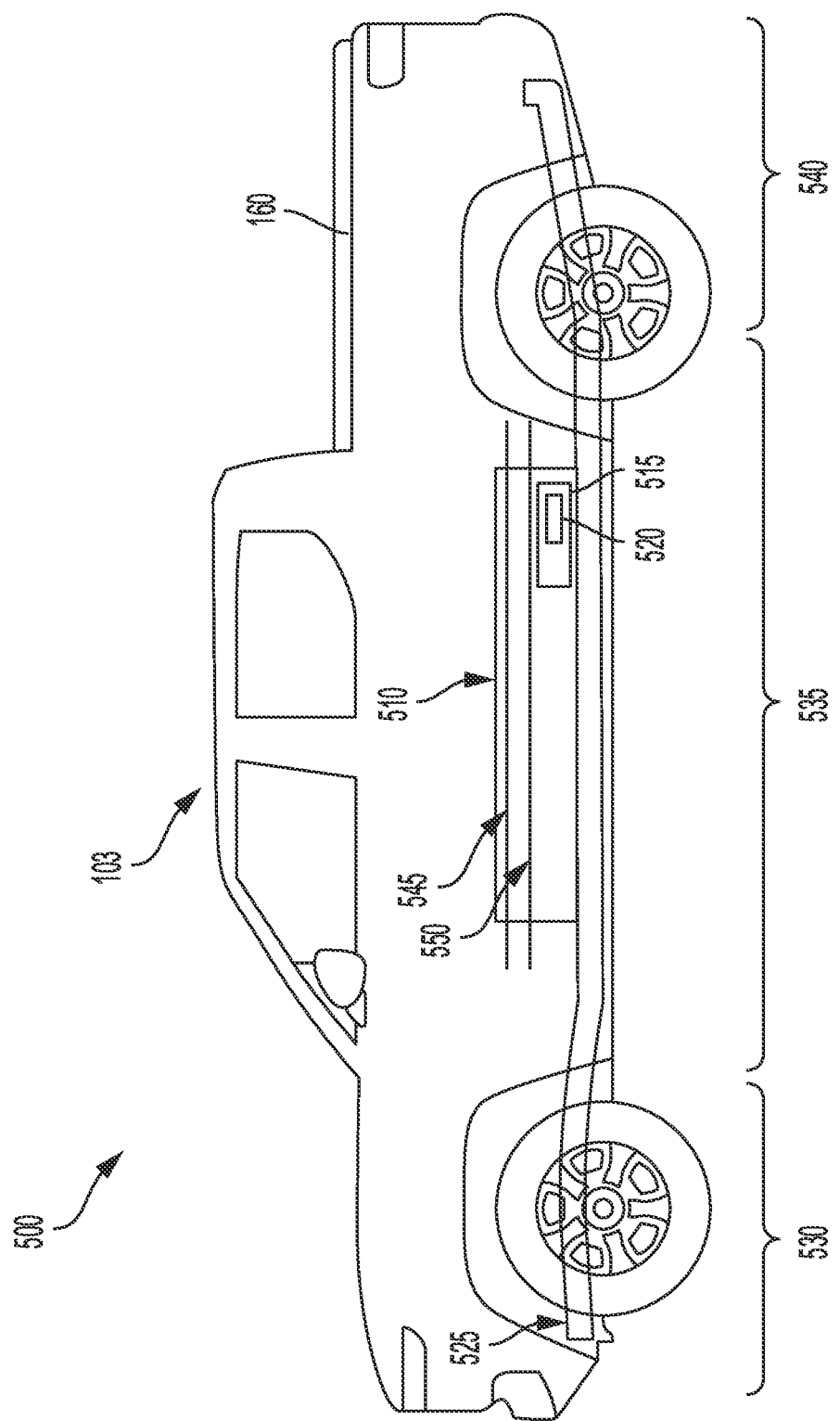
FIG. 5 depicts an example electric vehicle.

FIG. 5 depicts an example cross-sectional view 500 of an electric vehicle 103 installed with at least one battery pack 510. The electric vehicle 103 can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 510 can also be used as an energy storage system to power a building, such as a residential home or commercial building. The electric vehicle 103 can be fully electric or partially electric (e.g., plug-in hybrid) and further, electric vehicles 103 can be fully autonomous, partially autonomous, or unmanned. Electric vehicles 103 can also be human operated or non-autonomous. Electric vehicles 103 such as electric trucks or automobiles can include on-board battery packs 510, batteries 515 or battery modules 515, or battery cells 520 to power the electric vehicles. The electric vehicle 103 can include a chassis 525 (e.g., a frame, internal frame, or support structure). The chassis 525 can support various components of the electric vehicle 103. The chassis 525 can span a front portion 530 (e.g., a hood or bonnet portion), a body portion 535, and a rear portion 540 (e.g., a trunk, payload, or boot portion) of the electric vehicle 103. The battery pack 510 can be installed or placed within the electric vehicle 103. For example, the battery pack 510 can be installed on the chassis 525 of the electric vehicle 103 within one or more of the front portion 530, the body portion 535, or the rear portion 540. The battery pack 510 can include or connect with at least one busbar, e.g., a current collector element. For example, the first busbar 545 and the second busbar 550 can include electrically conductive material to connect or otherwise electrically couple the battery 515, the battery modules 515, or the battery cells 520 with other electrical components of the electric vehicle 103 to provide electrical power to various systems or components of the electric vehicle 103.

The vehicle can include the processor. The vehicle can generate the comparison that indicates the presence of the obstacle in the path of traversal of the tonneau cover, based on an error between one or more of a first metric of the first parameter that indicates detected torque at the tonneau cover and a second metric of the second parameter that indicates a threshold corresponding to the detected torque, a third metric of the first parameter that indicates detected velocity of the tonneau cover, and a fourth metric of the second parameter that indicates a threshold corresponding to the detected velocity, a fifth metric of the first parameter that indicates detected acceleration of the tonneau cover, and a sixth metric of the second parameter that indicates a threshold corresponding to the detected acceleration, a seventh metric of the first parameter that indicates detected current at a motor of the tonneau cover, and an eighth metric of the second parameter that indicates a threshold corresponding to the detected current, a ninth metric of the first parameter that indicates detected rate of change of current at the motor of the tonneau cover, and a tenth metric of the second parameter that indicates a threshold corresponding to the detected rate of change of current, and an eleventh metric of the first parameter that indicates detected displacement of the tonneau cover and a twelfth metric of the second parameter indicating a threshold corresponding to the detected displacement of the tonneau cover. These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

Figure 6:
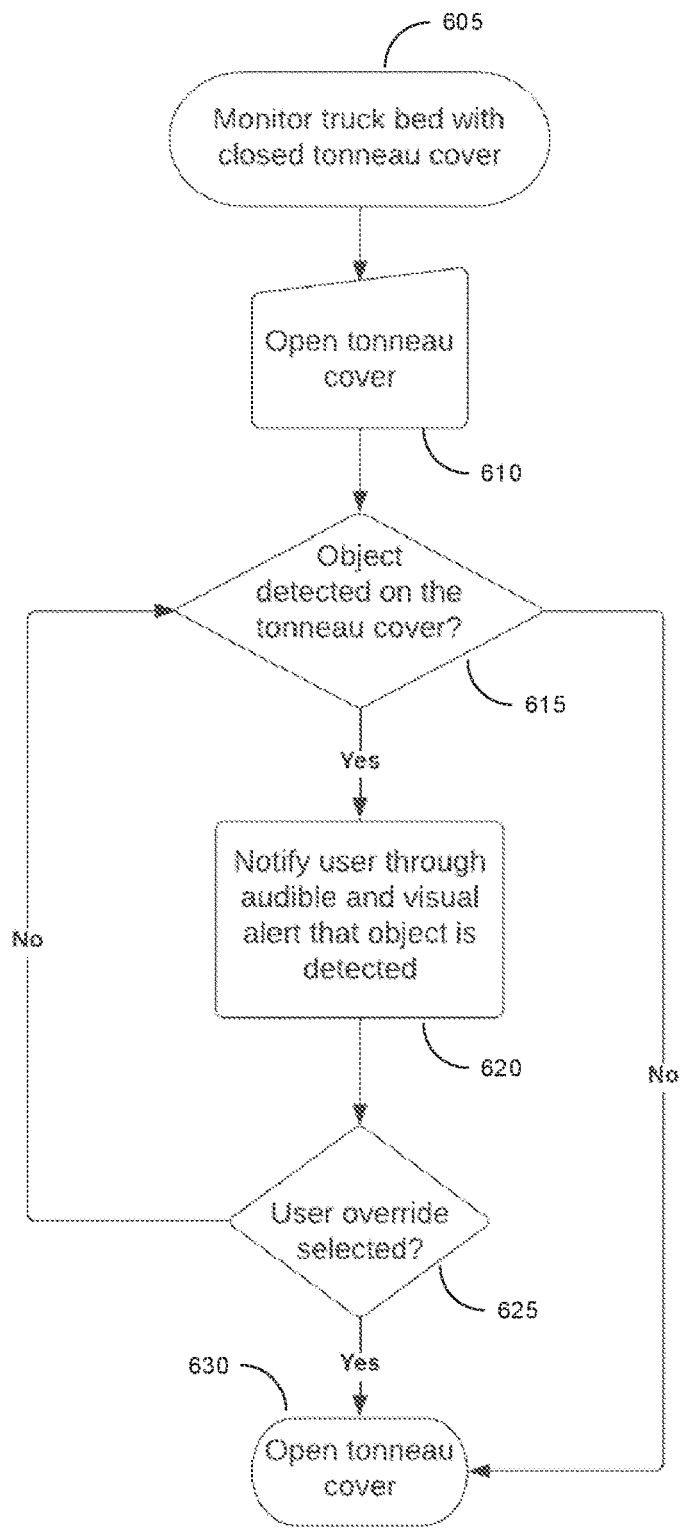
FIG. 6 depicts an example flowchart for object detection with respect to a closed tonneau cover state.

FIG. 6 depicts an example flowchart for object detection with respect to a closed tonneau cover state. At least one of the system 100 and the device 200 can perform method 600. The method 600 can monitor a truck bed with a closed tonneau cover. (Act 605.) For example, the method 600 can include monitoring by the trajectory processor 300. The method 600 can open a tonneau cover. (Act 610.) For example, the method 600 can include opening in response to receiving an opening instructions received from the vehicle 103 and the mobile device 104. The method 600 can determine whether an object is detected on a tonneau cover. (Act 615.) For example, the method 600 can include detecting by the obstacle detection engine 400. The method 600 can notify a user by one or more of an audible and visual alert that an object is detected on a tonneau cover. (Act 620.) For example, the method 600 can include generating a notification by one or more of the actuation controller 120, the vehicle 103, and the mobile device 104. The method 600 can determine whether a user override is selected. (Act 625.) For example, the method 600 can include obtaining a user override indicating that a tonneau cover is to be operated to complete an opening or closing operation subsequent to a detection of an obstacle by the obstacle detection engine 400. The method 600 can open a tonneau cover. (Act 630.) For example, the method 600 can include instructing the tonneau cover 160 to open by one or more of the vehicle 103 and the mobile 104.

Figure 7:
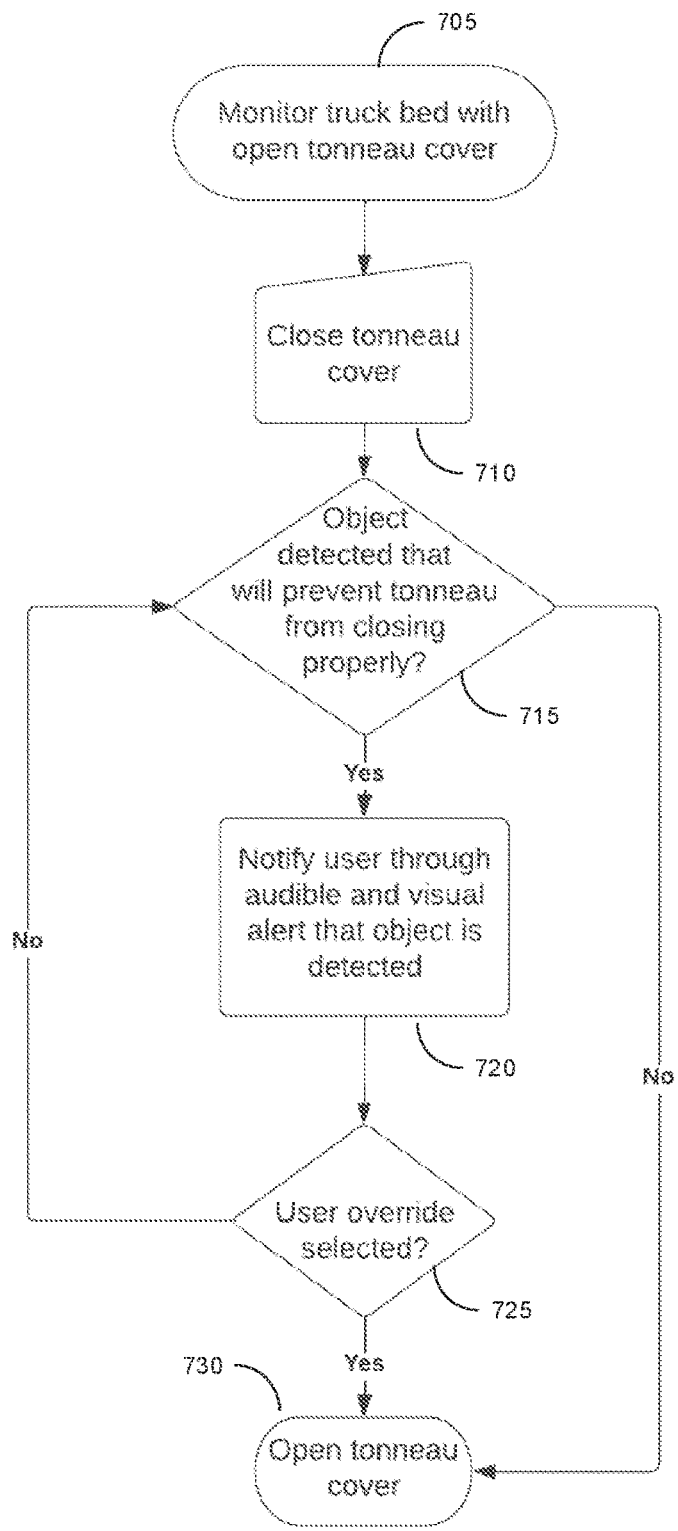
FIG. 7 depicts an example flowchart for object detection with respect to an open tonneau cover state.

FIG. 7 depicts an example flowchart for object detection with respect to an open tonneau cover state. At least one of the system 100 and the device 200 can perform method 700. The method 700 can monitor a truck bed with an open tonneau cover. (Act 705.) For example, the method 700 can include monitoring by the trajectory processor 300. The method 700 can close a tonneau cover. (Act 710.) For example, the method 700 can include closing in response to receiving an opening instructions received from the vehicle 103 and the mobile device 104. The method 700 can determine whether an object is detected that will prevent a tonneau cover from closing properly. (Act 715.) For example, the method 700 can include detecting by the obstacle detection engine 400. The method 700 can notify a user by one or more of an audible and visual alert that an object is detected that can prevent a tonneau cover from closing. (Act 720.)

For example, the method 700 can include generating an audible or visual alert by one or more of the vehicle 103 and the mobile device 104. For example, the data processing system 102 or the vehicle 103 can determine whether a user or driver of the vehicle is located within the vehicle, and can transmit an alert based on the determination. For example, the data processing system 102 or the vehicle 103 can determine whether a user or driver of the vehicle is located within the vehicle based on a determination that the mobile device 104 and the vehicle 103 are within a predetermined distance of each other. For example, the data processing system 102 or the vehicle 103 can determine whether a user or driver of the vehicle is located within the vehicle based on a determination that the mobile device 104 and the vehicle 103 have an active wireless communication connection via a particular wireless communication protocol. In response to a determination that a user or driver of the vehicle is located within the vehicle, the data processing system 102 or the vehicle 103 can generate an alert at the user interface 170 of the vehicle 103 and optionally forgo or block an alert at the mobile device 104. In response to a determination that a user or driver of the vehicle is not located within the vehicle, the data processing system 102 or the vehicle 103 can generate an alert at the mobile device 104 of the vehicle 103 and optionally forgo or block an alert at the user interface 170.

The method 700 can determine whether a user override is selected. (Act 725.) For example, the method 700 can include obtaining a user override indicating that a tonneau cover is to be operated to complete an opening or closing operation subsequent to a detection of an obstacle by the obstacle detection engine 400. The method 700 can open a tonneau cover. (Act 730.) For example, the method 700 can include instructing the tonneau cover 160 to close by one or more of the vehicle 103 and the mobile 104.

Figure 8:
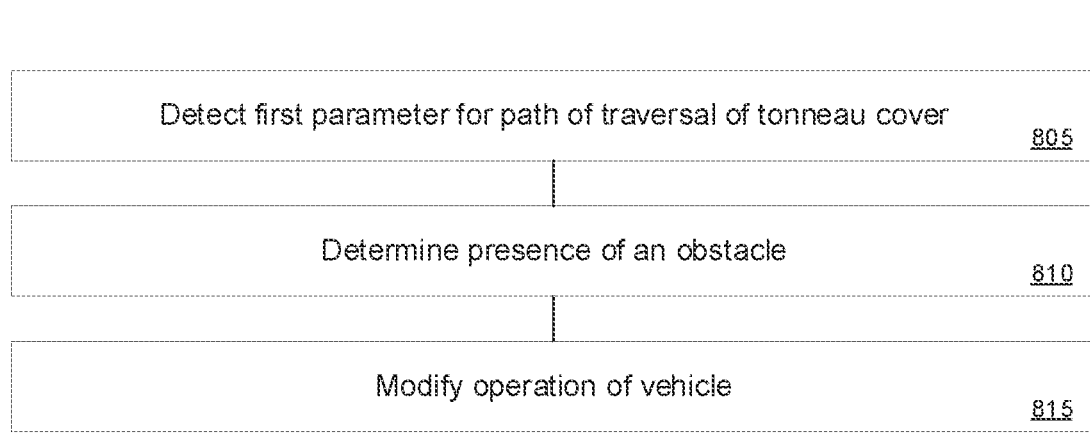
FIG. 8 depicts an example flowchart for managing an obstruction response.

FIG. 8 depicts an example flowchart for managing an obstruction response. At least the system 100 can perform method 800. The method 800 can detect a first parameter corresponding to a path of traversal of a tonneau cover. (Act 805.) For example, the method 800 can include detecting a first parameter corresponding to an actual trajectory. For example, a first parameter can include a first trajectory that indicates one or more characteristics associated with movement of the cover of the tonneau cover or electrical activity of the motor of the tonneau cover at particular times.

The method 800 can determine presence of an obstacle. (Act 810.) For example, the method 800 can include determining, based on comparison using the first parameter or first trajectory, presence of the obstacle in the path of traversal of the tonneau cover 160. For example, the method can include the first parameter corresponding to a trajectory of movement of the tonneau cover. The method can include the second parameter corresponding to a predetermined or predicted trajectory of movement of the tonneau cover. For example, the method 800 can include generating, based on one or more of a predetermined jerk corresponding to the tonneau cover, a predetermined velocity of movement of the tonneau cover, and a predetermined acceleration of movement of the tonneau cover, the second parameter. For example, the method 800 can generate the second parameter by restricting one or more of jerk, acceleration, velocity, displacement, and position to a predetermined value or range of values, and can allow others of the acceleration, velocity, displacement, and position to vary. The method 800 can generate a trajectory model corresponding to the second parameter based on various restricted and varying parameters to arrive at various models generated by the modelers 230, 235 and 240.

For example, the method 800 can determine presence of an obstacle based on a determination that a difference between a value of an actual trajectory at a particular time and a value of a predicted trajectory at a particular time exceeds a threshold. For example, the threshold can indicate a maximum difference between the value of an actual trajectory at a particular time and the value of a predicted trajectory at a particular time in the absence of presence of an obstacle in the path of traversal of the tonneau cover. For example, the second parameter can correspond to a predicted trajectory generated by the trajectory training engine 200.

The method 800 can facilitate modification of an operation of a vehicle in response to presence of an obstacle. (Act 815.) For example, the method 800 can include modifying operation by one or more of starting, stopping, slowing, or speeding an opening or closing of a powered tonneau cover 160, generating or presenting a notification by a user interface at one or more of the vehicle 103, the mobile device 104, or another device, or performing another action. For example, the method can include modifying the operation of the vehicle by modifying one or more of a position of the tonneau cover, a velocity of movement of the tonneau cover, or an acceleration of movement of the powered tonneau cover. For example, the method can include modifying the operation of the vehicle to cause a user interface of the vehicle to present an indication of the presence of the obstacle in the path of traversal of the tonneau cover.

The method can include generating, based on an error between one or more of a first metric of the first parameter that indicates detected torque at the tonneau cover and a second metric of the second parameter indicating a threshold corresponding to the detected torque, the comparison that indicates the presence of the obstacle in the path of traversal of the tonneau cover. The method can include generating, based on an error between one or more of a first metric of the first parameter that indicates detected velocity of the tonneau cover or detected acceleration of the tonneau cover, and a second metric of the second parameter that indicates a threshold corresponding to the detected velocity or the detected acceleration, the comparison indicating the presence of the obstacle in the path of traversal of the tonneau cover. The method can include generating, based on an error between one or more of a first parameter that indicates detected current at a motor of the tonneau cover or detected rate of change of current at the motor of the tonneau cover, and a second metric of the second parameter that indicates a threshold corresponding to the detected current or the detected rate of change of current, the comparison indicating the presence of the obstacle in the path of traversal of the tonneau cover. The method can include generating, based on an error between one or more of a first metric of the first parameter that indicates detected displacement of the tonneau cover and a second metric of the second parameter indicating a threshold corresponding to the detected displacement of the tonneau cover, the comparison that indicates the presence of the obstacle in the path of traversal of the tonneau cover.

Figure 9:
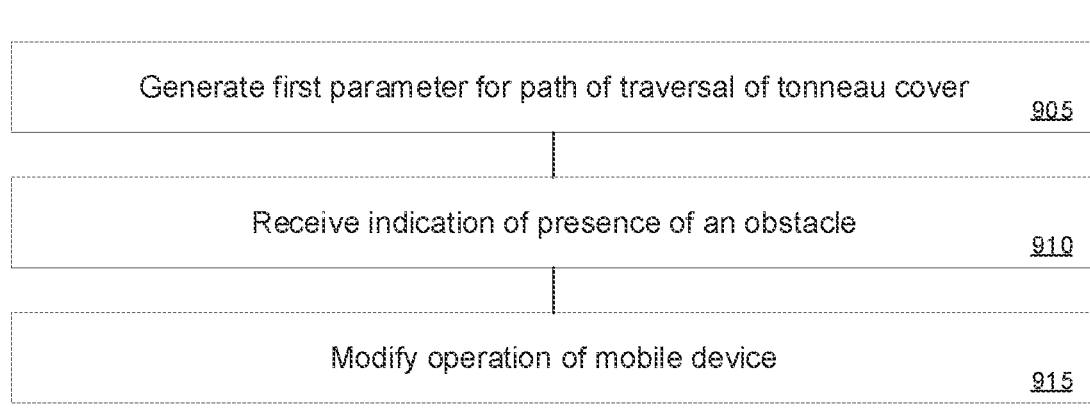
FIG. 9 depicts an example flowchart for managing a remote obstruction response.

FIG. 9 depicts an example managing a remote obstruction response. At least the system 100 can perform method 900.

The method 900 can generate first parameter corresponding to a path of traversal of a tonneau cover 160. (Act 905.) For example, the method 900 can include detecting a first parameter corresponding to an actual trajectory. For example, a first parameter can include a first trajectory that indicates one or more characteristics associated with movement of the cover of the tonneau cover or electrical activity of the motor of the tonneau cover at particular times.

The method 900 can receive an indication of a presence of an obstacle based on a comparison of the first trajectory with the second trajectory. (Act 910.) For example, the method 900 can indication of a presence of an obstacle based on a determination that a difference between a value of an actual trajectory at a particular time and a value of a predicted trajectory at a particular time exceeds a threshold. For example, the threshold can indicate a maximum difference between the value of an actual trajectory at a particular time and the value of a predicted trajectory at a particular time in the absence of presence of an obstacle in the path of traversal of the tonneau cover. For example, the second parameter can be based on the tonneau cover and the vehicle and can correspond to a predicted trajectory generated by the trajectory training engine 200. The method 900 can receive the indication at one or more of the vehicle 103 and the mobile device 104, from the data processing system 102, for example.

The method 900 can modify operation of a mobile device 104 in response to presence of an obstacle. (Act 915.) For example, the method 900 can include modifying operation by one or more of generating or presenting a notification by a user interface at the mobile device 104, or another device, or performing another action. For example, the method can include modifying the operation of the mobile device 104 by presenting a dynamic graphical user interface indicating a current state of one or more of a position of the tonneau cover, a velocity of movement of the tonneau cover, or an acceleration of movement of the tonneau cover. For example, the method 900 can include causing a user interface of the mobile device 104 to present an indication of the presence of the obstacle in the path of traversal of the tonneau cover. For example, the method 900 can include causing a user interface of the mobile device 104 to present an indication of a type or shape of the obstacle in the path of traversal of the tonneau cover.

FIG. 10 depicts an example block diagram of an example computer system 1000. The computer system or computing device 1000 can include or be used to implement a data processing system or its components. The computing system 1000 includes at least one bus 1005 or other communication component for communicating information and at least one processor 1010 or processing circuit coupled to the bus 1005 for processing information. The computing system 1000 can also include one or more processors 1010 or processing circuits coupled to the bus for processing information. The computing system 1000 also includes at least one main memory 1015, such as a random access memory (RAM) or other dynamic storage device, coupled to the bus 1005 for storing information, and instructions to be executed by the processor 1010. The main memory 1015 can be used for storing information during execution of instructions by the processor 1010. The computing system 1000 can further include at least one read only memory (ROM) 1020 or other static storage device coupled to the bus 1005 for storing static information and instructions for the processor 1010. A storage device 1025, such as a solid state device, magnetic disk or optical disk, can be coupled to the bus 1005 to persistently store information and instructions. For example, the processor 1010 can correspond at least partially in one or more of structure and operation to the system processor 110. For example, the computing system 1000 can implement at least partially in one or more of structure and operation to the system 100.

The computing system 1000 can be coupled via the bus 1005 to a display 1035, such as a liquid crystal display, or active matrix display, for displaying information to a user such as a driver of the electric vehicle 103 or other end user. An input device 1030, such as a keyboard or voice interface can be coupled to the bus 1005 for communicating information and commands to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement can also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C #, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. References to at least one of a conjunctive list of terms can be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics can be reversed. Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system comprising:
   a sensor operatively coupled with a tonneau cover of a vehicle, and a processor and memory to:
     detect, by the sensor, a first parameter that corresponds to, at a time period, an actual position of the tonneau cover along a path of traversal of the tonneau cover;
     determine, by the processor, based at least on the time period, a second parameter associated with a predicted position of the tonneau cover along the path of traversal of the tonneau cover;
     determine, by the processor, based on a comparison between the actual position of the tonneau cover and the predicted position of the tonneau cover, a presence of an obstacle in the path of traversal of the tonneau cover; and
     modify, by the processor, operation of the vehicle in response to the presence of the obstacle in the path of traversal of the tonneau cover.

2. The system of claim 1, comprising:
   the processor to modify the operation of the vehicle to modify one or more of a position of the tonneau cover or an acceleration of movement of the tonneau cover.

3. The system of claim 1, comprising:
   the processor to modify the operation of the vehicle to cause a user interface of the vehicle to present an indication of the presence of the obstacle in the path of traversal of the tonneau cover.

4. The system of claim 1, comprising:
   the first parameter further corresponding to a trajectory of movement of the tonneau cover; and the second parameter further corresponding to a predicted trajectory of movement of the tonneau cover.

5. The system of claim 1, comprising:
the processor to generate the second parameter based on one or more of a predetermined jerk corresponding to the tonneau cover or a predetermined acceleration of movement of the tonneau cover.

6. The system of claim 1, comprising:
the processor to further generate the comparison that indicates the presence of the obstacle in the path of traversal of the tonneau cover based on an error between a first metric of the first parameter indicative of detected torque at the tonneau cover and a second metric of the second parameter indicative of a threshold corresponding to the detected torque.

7. The system of claim 1, comprising:
the processor to further generate the comparison that indicates the presence of the obstacle in the path of traversal of the tonneau cover based on an error between a first metric of the first parameter that indicates the actual position and a second metric of the second parameter that indicates a threshold corresponding to a difference between the actual position and the predicted position.

8. The system of claim 1, comprising:
the processor to further generate the comparison that indicates the presence of the obstacle in the path of traversal of the tonneau cover based on an error between a first metric of the first parameter that indicates a detected current at a motor of the tonneau cover, a second metric of the first parameter that indicates a detected rate of change of current at the motor of the tonneau cover, and a third metric of the second parameter that indicates a threshold corresponding to the detected current and the detected rate of change of current.

9. The system of claim 1, comprising:
the processor to further generate the comparison that indicates the presence of the obstacle in the path of traversal of the tonneau cover based on an error between a first metric of the first parameter that indicates a detected displacement of the tonneau cover and a second metric of the second parameter that indicates a threshold corresponding to the detected displacement of the tonneau cover.

10. A method comprising:
detecting, by a sensor operatively coupled with a tonneau cover of a vehicle, a first parameter corresponding to, at a time period, an actual position of the tonneau cover along a path of traversal of the tonneau cover;
determining, by one or more processors coupled with memory, based at least on the time period, a second parameter associated with a predicted position of the tonneau cover along the path of traversal of the tonneau cover;
determining, by the one or more processors, based on a comparison between the actual position of the tonneau cover and the predicted position of the tonneau cover, a presence of an obstacle in the path of traversal of the tonneau cover; and
modifying, by the one or more processors, operation of the vehicle in response to the presence of the obstacle in the path of traversal of the tonneau cover.

11. The method of claim 10, comprising:
modifying, by the one or more processors, the operation of the vehicle by modifying one or more of a position of the tonneau cover or an acceleration of movement of the tonneau cover.

12. The method of claim 10, comprising:
modifying, by the one or more processors, the operation of the vehicle to cause a user interface of the vehicle to present an indication of the presence of the obstacle in the path of traversal of the tonneau cover.

13. The method of claim 10, comprising:
the first parameter further corresponding to a trajectory of movement of the tonneau cover; and
the second parameter further corresponding to a predicted trajectory of movement of the tonneau cover.

14. The method of claim 10, comprising:
generating, by the one or more processors, the second parameter based on one or more of a predetermined jerk corresponding to the tonneau cover or a predetermined acceleration of movement of the tonneau cover.

15. The method of claim 10, comprising:
generating, by the one or more processors, the comparison that indicates the presence of the obstacle in the path of traversal of the tonneau cover further based on an error between a first metric of the first parameter that indicates detected torque at the tonneau cover and a second metric of the second parameter indicating a threshold corresponding to the detected torque.

16. The method of claim 10, comprising:
generating, by the one or more processors, the comparison indicating the presence of the obstacle in the path of traversal of the tonneau cover further based on an error between a first metric of the first parameter that indicates the actual position and a second metric of the second parameter that indicates a threshold corresponding to a difference between the actual position and the predicted position.

17. The method of claim 10, comprising:
generating, by the one or more processors, the comparison indicating the presence of the obstacle in the path of traversal of the tonneau cover further based on an error between a first metric of the first parameter that indicates a detected current at a motor of the tonneau cover, a second metric of the first parameter that indicates a detected rate of change of current at the motor of the tonneau cover, and a third metric of the second parameter that indicates a threshold corresponding to the detected current and the detected rate of change of current.

18. The method of claim 10, comprising:
generating, by the one or more processors, the comparison that indicates the presence of the obstacle in the path of traversal of the tonneau cover further based on an error between a first metric of the first parameter that indicates a detected displacement of the tonneau cover and a second metric of the second parameter indicating a threshold corresponding to the detected displacement of the tonneau cover.

19. A vehicle, comprising:
a tonneau cover;
a sensor operatively coupled with the tonneau cover; and
a processor to:
detect, by the sensor, a first parameter that corresponds to, at a time period, an actual position of the tonneau cover along a path of traversal of the tonneau cover;
determine, by the processor, based at least on the time period, a second parameter associated with a predicted position of the tonneau cover along the path of traversal of the tonneau cover;

determine, by the processor and based on a comparison between the actual position of the tonneau cover and the predicted position of the tonneau cover, a presence of an obstacle in the path of traversal of the tonneau cover; and modify, by the processor, operation of the vehicle in response to the presence of the obstacle in the path of traversal of the tonneau cover.

20. The vehicle of claim 19, comprising:

the processor to further generate the comparison that indicates the presence of the obstacle in the path of traversal of the tonneau cover based on an error between:
- a first metric of the first parameter that indicates a detected torque at the tonneau cover and a second metric of the second parameter that indicates a threshold corresponding to the detected torque,
- a third metric of the first parameter that indicates a detected velocity of the tonneau cover and a fourth metric of the second parameter that indicates a threshold corresponding to the detected velocity,
- a fifth metric of the first parameter that indicates a detected acceleration of the tonneau cover and a sixth metric of the second parameter that indicates a threshold corresponding to the detected acceleration,
- a seventh metric of the first parameter that indicates a detected current at a motor of the tonneau cover and an eighth metric of the second parameter that indicates a threshold corresponding to the detected current,
- a ninth metric of the first parameter that indicates a detected rate of change of current at the motor of the tonneau cover and a tenth metric of the second parameter that indicates a threshold corresponding to the detected rate of change of current, and
- an eleventh metric of the first parameter that indicates a detected displacement of the tonneau cover and a twelfth metric of the second parameter indicating a threshold corresponding to the detected displacement of the tonneau cover.

\* \* \* \* \*